US006877598B2

United States Patent
Hattori et al.

(10) Patent No.: US 6,877,598 B2
(45) Date of Patent: Apr. 12, 2005

(54) APPARATUS AND METHOD FOR TRANSFERRING FORMED PIECES

(75) Inventors: Minoru Hattori, Yaizu (JP); Keizo Baba, Fujieda (JP)

(73) Assignee: Yamanouchi Pharmaceutical Co., Ltd. (JP)

(*) Notice: Subject to any disclaimer, the term of this patent is extended or adjusted under 35 U.S.C. 154(b) by 24 days.

(21) Appl. No.: 10/283,320

(22) Filed: Oct. 30, 2002

(65) Prior Publication Data

US 2004/0057819 A1 Mar. 25, 2004

(30) Foreign Application Priority Data

Sep. 20, 2002 (JP) ........................................ 2002-274770

(51) Int. Cl.[7] ............................................... B65G 11/00
(52) U.S. Cl. ..................................... 193/25 R; 414/808
(58) Field of Search ................................ 193/25 R, 32; 414/403, 404, 413, 414, 418, 422, 808, 810

(56) References Cited

U.S. PATENT DOCUMENTS 3,684,072 A * 8/1972 Castrellon ...................... 193/7
4,688,667 A * 8/1987 Peterson ........................ 193/10

FOREIGN PATENT DOCUMENTS

| JP | 56-113615 | | 9/1981 |
| JP | 10-203617 | | 8/1988 |
| JP | 2152601 | * | 6/1990 |
| JP | 72326 | * | 1/1995 |
| JP | 10203617 | * | 8/1998 |
| JP | 10338318 | * | 12/1998 |

* cited by examiner

Primary Examiner—Janice L. Krizek
(74) Attorney, Agent, or Firm—Lorusso, Loud & Kelly

(57) ABSTRACT

A transfer apparatus transfers tablets ejected from a tableting machine to a container. The transfer apparatus includes a first chute, a cloth chute which serves as a buffer disposed at one end of the first chute, a winding apparatus for lifting the free end of the cloth chute, a bucket for receiving the tablets from the cloth chute, and a swiveling lift for moving the bucket. Because the formed pieces are not transported directly from the first chute to the bucket, but are first received within the buffer and then transported to the container, occurrence of cracking or chipping of the formed pieces can be prevented and high quality can also be maintained through minimizing the impact on the formed pieces which would otherwise occur during transporting.

8 Claims, 3 Drawing Sheets

APPARATUS AND METHOD FOR TRANSFERRING FORMED PIECES

BACKGROUND OF THE INVENTION

1. Field of the Invention

The present invention relates to an apparatus and a method for transferring formed pieces, and specifically to the apparatus and the method for transferring formed soft pieces, for example intraoral soluble tablets which are easily crumbled or dissolved within an oral cavity.

2. Description of the Related Art

In manufacturing medicinal tablets, when the tablets ejected from a production apparatus such as a tableting machine are received in a container, the tablets have been transported by methods such as a gravity method where they naturally drop from the tableting machine into the container, a bucket conveyer method where they are moved into buckets for transport to the container, an air transportation method using clean air, and a conveyer belt method.

Now, among known medicinal tablets is a so-called intraoral soluble tablet which is easily dissolved or crumbled within an oral cavity for ease of swallowing. The intraoral soluble tablets are so fragile as to suffer cracking, chipping, splitting, or cutting even by a vertical drop of only about 20 cm. Therefore, there has been a problem that such tablets obtained are liable to crack or chip by means of the above-mentioned conventional methods of receiving the tablets in the container.

Consequently, for the transfer of tablets, proposed is an apparatus by which cracking or chipping is not liable to occur, the apparatus employing a spiral chute to make the dropping distance of the tablets shorter. See, for example, JP 10-203617 (See especially Page 4, FIG. 1).

However, since the spiral chute used is complicated in shape in JP 10-203617, there have been problems in that machining takes so much time as to raise machining costs and cleaning is also laborious.

SUMMARY OF THE INVENTION

The object of the present invention is to provide an apparatus and a method for transferring formed pieces wherein cracking and chipping of the formed pieces can be prevented in the manufacturing of fragile pieces such as an intraoral soluble tablet, by means of simple apparatus and method.

The apparatus for transferring formed pieces according to the present invention is an apparatus for transferring formed pieces between positions at different heights, comprising: chute means for receiving said formed pieces ejected from a forming apparatus; buffer means connected to said chute means; and transport means for transporting said formed pieces from the vicinity of said buffer means to a predetermined position; wherein said buffer means includes a cylindrical portion made of a cloth material having a free end portion which can be opened out.

As mentioned above, since the apparatus for transferring formed pieces of the present invention is configured such that the formed pieces ejected from the forming apparatus are not transported directly from the chute means to the transport means, but are first received and stored in the buffer means and then transported from the vicinity of the buffer means to the predetermined position, occurrence of cracking and chipping can be prevented through relaxing the impact during transferring the formed pieces.

Since the buffer means is configured such that it includes a cylindrical portion made of cloth material having a free end portion which can be opened out, and that its cylindrical portion receives the formed pieces therein by lifting the end portion thereof, even granules like a tablet can be surely received. Moreover, since the structure is simple, the buffer effect can be obtained at a low cost. Further, since cleaning or a change of the buffer means is easy, its maintenance is not laborious.

The method for transferring formed pieces according to the present invention is a method for transferring formed pieces between positions at different heights, comprising the steps of: allowing said formed pieces to fall down from a forming apparatus; storing said fallen formed pieces in buffer means; ejecting said formed pieces from said buffer means; and transporting said ejected formed pieces to the predetermined position.

DETAILED DESCRIPTION OF THE INVENTION

In the following, an embodiment of the present invention will be described with reference to the drawings. Further, the members, the disposition, etc. described in the following are not intended to limit the present invention, but can be modified or changed within the scope of the spirit of the present invention.

The transfer apparatus S of the present embodiment will be described with reference to transfer of intraoral soluble tablets as an example of formed pieces.

Figure 1:
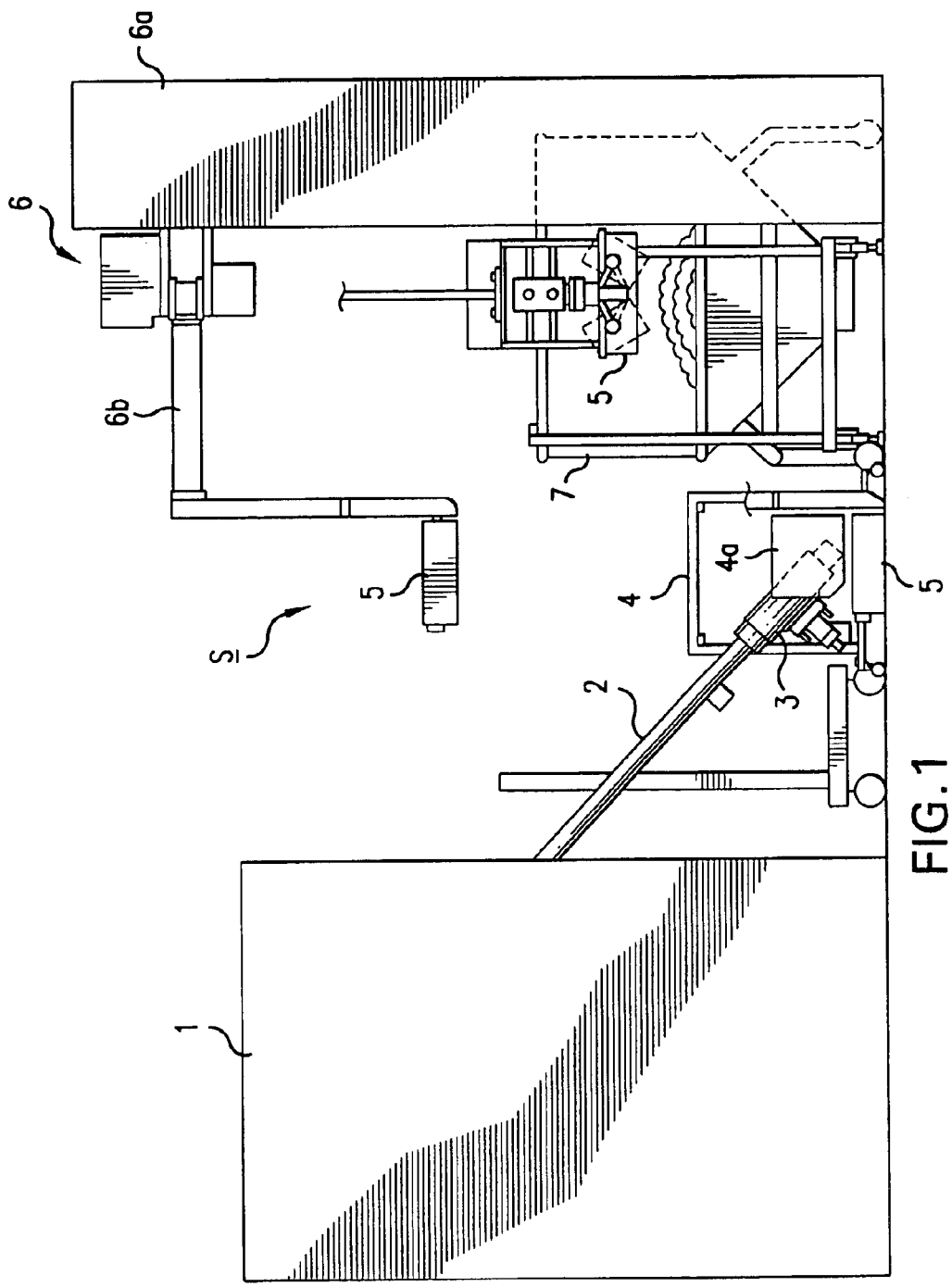
FIG. 1 is a front view of an apparatus for transferring formed pieces according to the present invention.

As shown in FIG. 1, the transfer apparatus S transfers tablets ejected from a tableting machine 1 to a container 7. The transfer apparatus S comprises a tablet carrying chute 2 as chute means, a cloth chute 3 as buffer means disposed in the tablet carrying chute 2, a winding apparatus 4 for lifting the end portion of the cloth chute 3, a bucket 5 for receiving the tablets from the cloth chute 3, and a swiveling lift 6 for moving the bucket 5 to a predetermined position. In this embodiment, the bucket 5 and the swiveling lift 6 compose transport means.

The tablet carrying chute 2 is connected to the tableting machine for receipt and gravity transport of the tableted tablets. The tablet carrying chute 2 is disposed, for example, at an angle of 45° to the sitting plane of the tableting machine 1. The tablets ejected from tableting machine 1 are transported by sliding down under their own weight on the tablet carrying chute 2.

Figure 2:
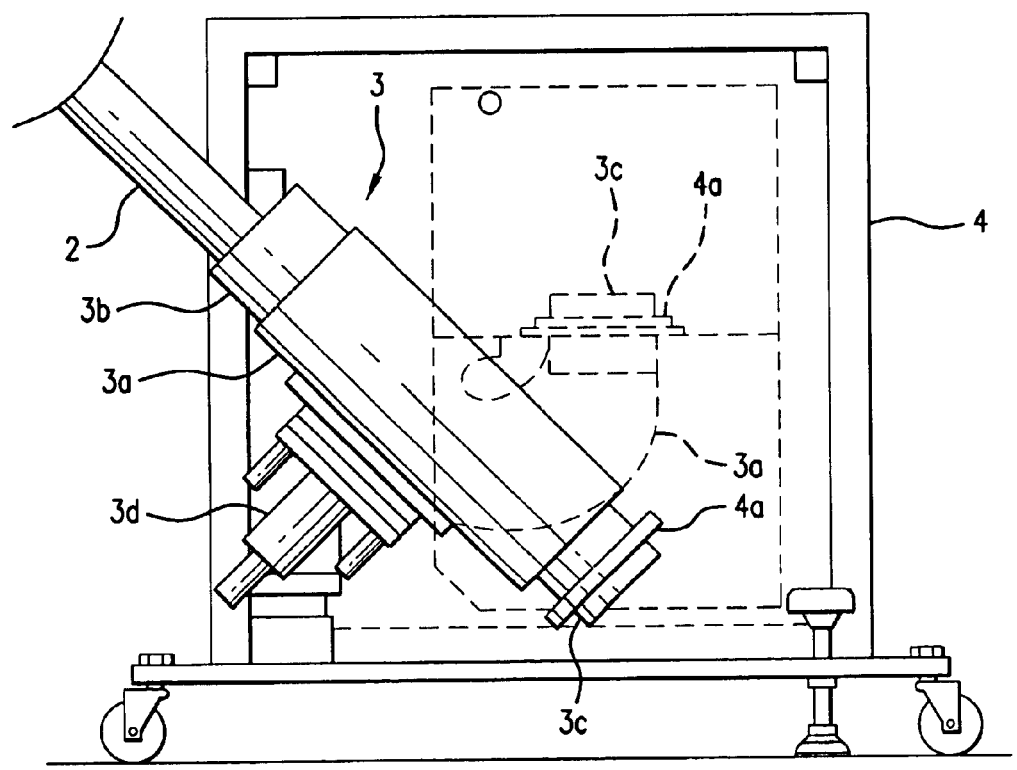
FIG. 2 is an enlarged view of a portion of the apparatus shown in FIG. 1.

The cloth chute 3 as the buffer means is connected to the tablet carrying chute 2. The cloth chute 3 is for receiving the tablets below the tableting machine 1 without impacting on the tablets, which are very fragile before hardening treatment. As shown in FIG. 2, The cloth chute 3 comprises a cylindrical main body 3a made of cloth, cylindrical connection portions 3b, 3c disposed at both end portions of the main body 3a, and a support portion 3d. Preferably, the connection portions are removable from the main body 3a, to allow easy change of the main body 3a.

The main body 3a of the cloth chute 3 is made of cloth of cotton, synthetic fiber, a resin sheet, or a rubber sheet.

Additionally, it is preferable to use cloth with a cushioning property such as pile cloth, flannelette, i.e., a cloth having a raised surface. Moreover, in order to obtain better buffer effect, the inner surface of the cloth is lined with a foam sheet made of polypropylene, polyethylene, polyurethane, etc.

One connection portion 3b of the connection portions disposed on the main body 3a of the cloth chute 3 is connected to the tablet carrying chute 2 and is configured to receive the tablets which drop and slide down on the tablet carrying chute 2. The other connection portion 3c is connected to the winding apparatus 4 disposed in the vicinity of the cloth chute 3.

The winding apparatus 4 serves to lift the end portion of the cylindrical cloth chute 3 in order to retain the tablets therein. The winding apparatus 4 comprises a holding portion 4a which holds the connection portion 3c of the cloth chute. While receiving the tablets, the holding portion 4a is lifted upward. By this movement, the opening of the connection portion 3c is lifted and swiveled in order to face upward.

The cloth chute 3 is held in the state where the tablets inside will not come out by holding it so as to make the opening of the connection portion 3c face upward. In this manner, the tablets which have slid down the tablet carrying chute 2 are received within the cloth chute 3.

When the tablets stored in the cloth chute 3 have accumulated to a prescribed amount, the end portion of the cloth chute 3 is lowered to its former position, with the connection portion 3c facing downward, to eject the tablets.

By use of an automatic winding apparatus 4, storage and ejection of the tablets by the cloth chute can be operated automatically. When automatic operation is employed, it is preferable to set a timer on the winding apparatus 4 and also to set a period during which the prescribed amount of the tablets accumulate in the cloth chute 3, depending on the amount of tablets formed per unit time. As an alternative, a sensor may be placed on the cloth chute 3 and the winding apparatus 4 operated when the weight of the cloth chute 3 reaches a prescribed value.

The bucket 5 receives the tablets from the cloth chute 3 and is then moved from the reception position where the tablets are received to a storage position by the swiveling lift 6. At the reception position of the tablets, the distance between the cloth chute 3 and the bucket 5 is set such that no cracking or chipping of the tablets may occur.

Further, at the storage position, the distance between the container 7 and the bucket 5 is adjusted so that no cracking or chipping of the tablets may occur. In the present embodiment, a sensor is disposed on the bottom of the bucket 5 and the bucket 5 is configured to be able to stop either at a position most adjacent to the bottom surface of the container 7 or at a position adjacent the upper surface of the tablets already received within the container 7, as detected by the sensor. Thereby, cracking and chipping of the tablets are prevented during transfer of the tablets into the container 7.

Additionally, the bucket 5 of the present embodiment is configured so that the bottom portion thereof can be opened and closed. The bucket 5 takes, while receiving the tablets, the shape of a box with its bottom portion closed. On the other hand, during transfer of the tablets into the container 7, the tablets are ejected by opening the bottom portion.

Figure 3:
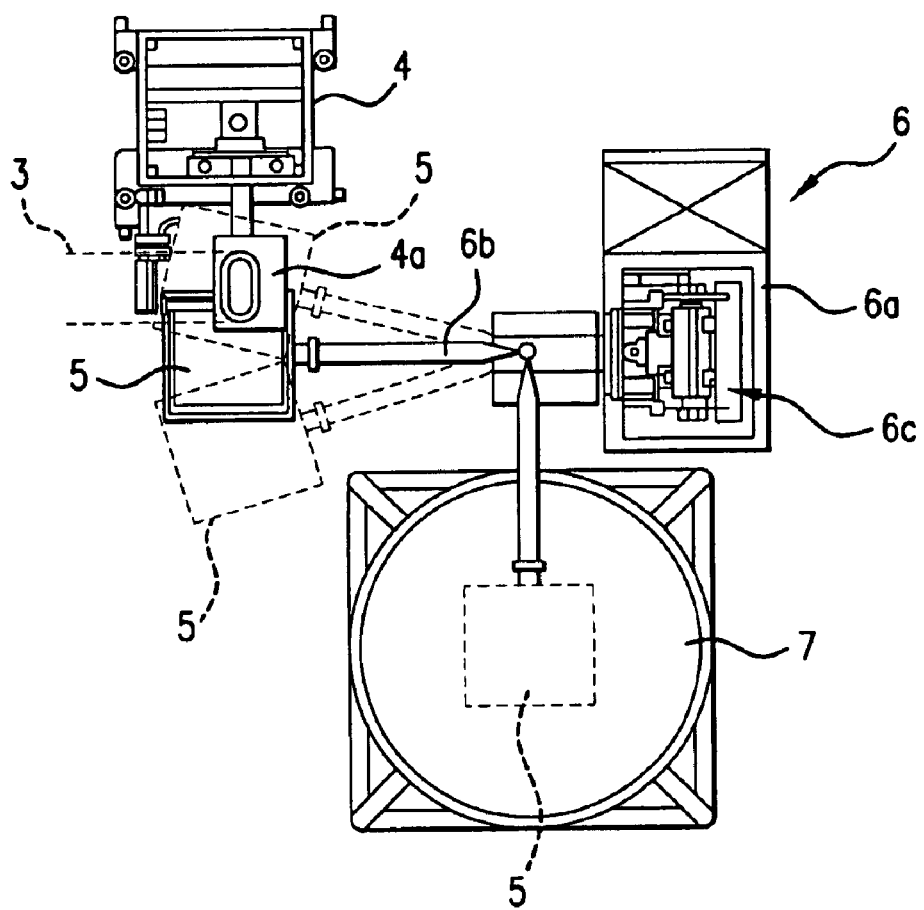
FIG. 3 is a plan view of the apparatus for transferring formed pieces according to the present invention.

As shown in FIG. 3, the swiveling lift 6 comprises a tower 6a, an arm portion 6b holding the bucket 5, and a driving portion 6c for moving the arm portion 6b up and down. The arm portion 6b is moved along the frame of the tower 6a and is configured to be able to swivel.

The driving portion 6c for moving the arm portion 6b, comprises for example, a motor and a drive belt. However, it is obvious that other driving mechanisms including a hydraulic cylinder, an air cylinder, etc. may be used as the mechanism for moving the arm portion 6b up and down.

The driving portion 6c also includes a motor for swiveling the arm portion 6b. The arm portion 6b is, as shown in FIG. 3, configured to be able to swivel within a range extending from a position adjacent the cloth chute 3 to the location of the container 7.

Next, the method for transferring tablets using the transfer apparatus S having the above constitution will be described.

Firstly, the winding apparatus 4 is operated to lift the end portion of the cloth chute 3 bringing it into a position for storing the tablets. Then, the tablets are formed and ejected from the tableting machine 1 by the prescribed amount per unit time. The ejected tablets slide down the tablet carrying chute 2 to be received into the cloth chute 3. Once the cloth chute 3 is filled with the prescribed amount of the tablets, the winding apparatus 4 is again operated to return the cloth chute 3 to its former ("original") position.

When the cloth chute 3 is returned to the original position, so that the tablets are transferred from the cloth chute 3 into the bucket 5. The distance from the cloth chute 3 to the bucket 5 is set such that no cracking or chipping of the tablets may occur.

Further, since the tablets are transported to the bucket 5 while held within the cloth chute 3, while making the height difference as small as possible, they are loaded into the bucket comparatively softly with the result that the tablets do not jump out of the bucket 5.

After the tablets are loaded into the bucket 5, the driving portion 6c of the swiveling lift 6 is operated to raise the bucket 5 along the tower 6a as the arm portion 6b is moved upward. Further, the arm portion 6b is swiveled at the raised position swiveling the bucket 5 around the swiveling axis, and the bucket 5 is thereby moved to a position above the container 7.

Once the bucket 5 is moved to the position above the container 7, the bucket 5 is lowered along the tower 6a. A sensor is provided on the bottom portion of the bucket 5 so that bucket 5 can be stopped at a position adjacent the bottom surface of the container 7 or adjacent the upper surface of the tablets already received within the container 7. The bottom plate of the bucket 5 is then opened and the tablets in the bucket 5 are loaded into the container 7. After emptying, the bucket 5 is again moved to the vicinity of the cloth chute 3. Repeating the above steps, the tablets are transferred until the container 7 is filled, and then production is completed via sequential steps such as a humidifying-drying step and a packaging step.

In the above-described embodiment intraoral soluble tablets are described as the formed pieces, however the formed pieces can be tablets with higher hardness, surface-coated tablets, encapsulated tablets, confectionary, or the like.

Further, in the above-described embodiment formed pieces are accumulated inside the cloth chute 3 by lifting the end portion thereof; however alternatively, the cloth chute 3 may be converted into the shape of a bag by clipping its end portion with a clip-like member. Alternatively, a shutter may be provided in the connection portion 3c.

Still further, in the above-described embodiment, while there is only one set of the tablet carrying chute 2, the cloth chute 3, and the bucket 5 employed, it may be preferable to adopt a system wherein the tablets are sequentially transferred using a plurality of sets of the tablet carrying chute 2, the cloth chute 3, and the bucket 5.

As mentioned above, according to the apparatus and method for transferring formed pieces of the present invention, since the formed pieces are not transported directly from the chute means to the transport means, but are first received within the buffer means and then transported from the vicinity of the buffer means to the container, occurrence of cracking or chipping of the formed pieces can be prevented and high quality can be maintained through relaxing the impact which occurs during transfer of the formed pieces from the chute to the transport means.

Moreover, since the cloth chute is used as the buffer means, a buffer effect can be obtained by a simple means. Further, since cleaning or changing of the buffer means can be easily done, its maintenance is also able to be performed with ease.

What is claimed is:

1. An apparatus for transferring formed pieces between positions at different heights, comprising:

a chute for receiving at an upper end thereof at one height, the formed pieces ejected from a forming apparatus, and for guiding the formed pieces to a lower end thereof;

buffer means connected to said lower end of said chute for accumulating the formed pieces therein, said buffer means including a cloth cylinder attached at one end to the chute and extending to a free end; and discharge means for discharging the accumulated formed pieces through the free end of said buffer means at a second height, lower than said one height.

2. The apparatus of claim 1 further comprising lifting means for lifting the free end of the cloth cylinder to accumulate the formed pieces and for lowering the free end of the cloth cylinder to discharge the accumulated formed pieces.

3. The apparatus of claim 1 wherein said cloth cylinder has a raised surface in the form of pile or flannelette.

4. The apparatus of claim 1 further comprising a foam lining on the inner surface of the cloth cylinder.

5. A method for transferring formed pieces between positions at different heights, comprising the steps of:

dropping the formed pieces from a forming apparatus, at one height, through a chute;

receiving the formed pieces dropped through the chute in a cloth cylinder buffer attached to the lower end of the chute;

accumulating the formed pieces in the cloth cylinder buffer; and discharging the accumulated formed pieces at a second height lower than the one height, through a free end of the cloth cylinder buffer.

6. The method of claim 5 further comprising raising the free end of the cloth cylinder buffer to a position for said accumulating and wherein said discharging is by lowering the free end of the cloth cylinder buffer.

7. The method of claim 5 wherein the cloth cylinder buffer has a raised surface in the form of pile or flannelette.

8. The method of claim 5 wherein the cloth cylinder buffer has a foam lining on its inner surface.

* * * * *